(12) United States Patent
Choi et al.

(10) Patent No.: US 10,499,177 B2
(45) Date of Patent: Dec. 3, 2019

(54) VOLUME CONTROL FOR INDIVIDUAL SOUND ZONES

(71) Applicant: Harman International Industries, Incorporated, Stamford, CT (US)

(72) Inventors: Jason Choi, Ferndale, MI (US); Christopher Michael Trestain, Livonia, MI (US); Chris Ludwig, Birmingham, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 19 days.

(21) Appl. No.: 15/941,485

(22) Filed: Mar. 30, 2018

(65) Prior Publication Data

US 2018/0302734 A1 Oct. 18, 2018

Related U.S. Application Data

(60) Provisional application No. 62/486,394, filed on Apr. 17, 2017.

(51) Int. Cl.
| | | |
|---|---|---|
| H04S 7/00 | (2006.01) | |
| G06F 3/16 | (2006.01) | |
| H04R 1/22 | (2006.01) | |
| H04R 3/12 | (2006.01) | |
| H04R 5/02 | (2006.01) | |
| H04R 5/04 | (2006.01) | |

(52) U.S. Cl.
CPC ............ H04S 7/30 (2013.01); G06F 3/165 (2013.01); H04R 1/22 (2013.01); H04R 3/12 (2013.01); H04R 5/02 (2013.01); H04R 5/04 (2013.01); H04R 2430/01 (2013.01)

(58) Field of Classification Search
CPC ... H04R 1/22; H04R 3/12; H04R 5/02; H04R 5/04; H04R 2430/01; H04S 7/30; G06F 3/165
USPC .......................................................... 700/94
See application file for complete search history.

(56) References Cited

U.S. PATENT DOCUMENTS

| | | | |
|---|---|---|---|
| 2006/0262935 A1* | 11/2006 | Goose | H04S 3/002 381/17 |
| 2013/0170668 A1 | 7/2013 | Hess et al. | |
| 2015/0223002 A1* | 8/2015 | Mehta | H04S 7/30 381/303 |
| 2017/0053636 A1* | 2/2017 | Oswald | G10K 11/178 |

FOREIGN PATENT DOCUMENTS

| | | |
|---|---|---|
| DE | 102015200718 A1 | 8/2016 |
| WO | WO 2016/008621 A1 | 1/2016 |

OTHER PUBLICATIONS

Goose, Stuart et al; "PAZ: In-Vehicle Personalized Audio Zones"; IEEE Multimedia, (Oct. 2016), pp. 32-41, vol. 23, No. 4, IEEE Service Center, New York, US.

* cited by examiner

Primary Examiner — Hemant S Patel
(74) Attorney, Agent, or Firm — Angela M. Brunetti

(57) ABSTRACT

A system and method for applying an individual volume control setting to individual sound zones as set by a user. When the individual volume control setting differs from a master volume control setting, the individual volume control setting is applied to the low frequency component of the audio signal. Headrest and optional height speakers for each individual sound zone's independent volume setting are applied to the mid and high frequency components of the audio signal.

7 Claims, 3 Drawing Sheets

VOLUME CONTROL FOR INDIVIDUAL SOUND ZONES

CROSS REFERENCE TO RELATED APPLICATIONS

This application claims the benefit of U.S. Provisional Application Ser. No. 62/486,394, filed Apr. 17, 2017, the disclosure of which is incorporated in its entirety by reference.

TECHNICAL FIELD

The present disclosure is directed to a signal processing arrangement for independent volume control at individual listening positions within a listening environment.

BACKGROUND

An increased interest has developed for advanced sound reproduction systems capable of providing different sound in different spatial portions of a listening environment, also called individual sound zones (ISZ). At least two different sound zones are provided within one listening environment and the sound to be reproduced and presented to listeners in each sound zone may be different. The listening environment may be, for example, the interior of a vehicle, such as an automobile.

Such a sound system is tuned to optimize sound quality for each sound zone. The system relies on loudspeakers strategically placed within the listening environment, such as in a headrest and/or in a headliner of the vehicle interior. However, a master volume control is the only source for setting the volume. Therefore, listeners in each sound zone do not have the capability to set a listening volume preference for their individual sound zone. Furthermore, in known individual sound zone systems, stereo sound is not always preserved in a manner that optimizes sound quality for each sound zone, particularly when volume adjustments are made.

There is a need for independent volume control of individual sound zones that also preserves audio quality in each sound zone.

SUMMARY

A system and method for applying an individual volume control setting to each individual sound zone in a plurality of individual sound zones for a volume control setting at a sound zone, set by a user, which differs from a master volume control setting. The individual volume control setting is applied to the low frequency component of the audio signal. Headrest and optional height speakers for each individual sound zone's independent volume are used for mid and high frequencies of the audio signal. ISZ and low pass filters are used for the bass frequencies. Control signals change the gain fir headrest speakers (and optional height speakers) and the ISZ bass for each individual sound zone.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

While various aspects of the present disclosure are described with reference to a particular illustrative embodiment, the present disclosure is not limited to such embodiments, and additional modifications, applications, and embodiments may be implemented without departing from the present disclosure. In the figures, like reference numbers will be used to illustrate the same components. Those skilled in the art will recognize that the various components set forth herein may be altered without varying from the scope of the present disclosure.

Any one or more of the devices described herein include computer executable instructions that may be compiled or interpreted from computer programs created using a variety of programming languages and/or technologies. In general, a processor (such as a microprocessor) receives instructions, for example from a memory, a computer-readable medium, or the like, and executes the instructions. A processing unit includes a non-transitory computer-readable storage medium capable of executing instructions of a software program. The computer readable storage medium may be, but is not limited to, an electronic storage device, a magnetic storage device, an optical storage device, an electromagnetic storage device, a semi-conductor storage device, or any suitable combination thereof. One or more devices may operate using a dedicated operating system, multiple software programs and/or platforms for interfaces such as graphics, audio, wireless networking, enabling applications, integrating hardware of vehicle components, systems, and external devices such as smart phones, tablets, and other systems to name just a few.

Figure 1:
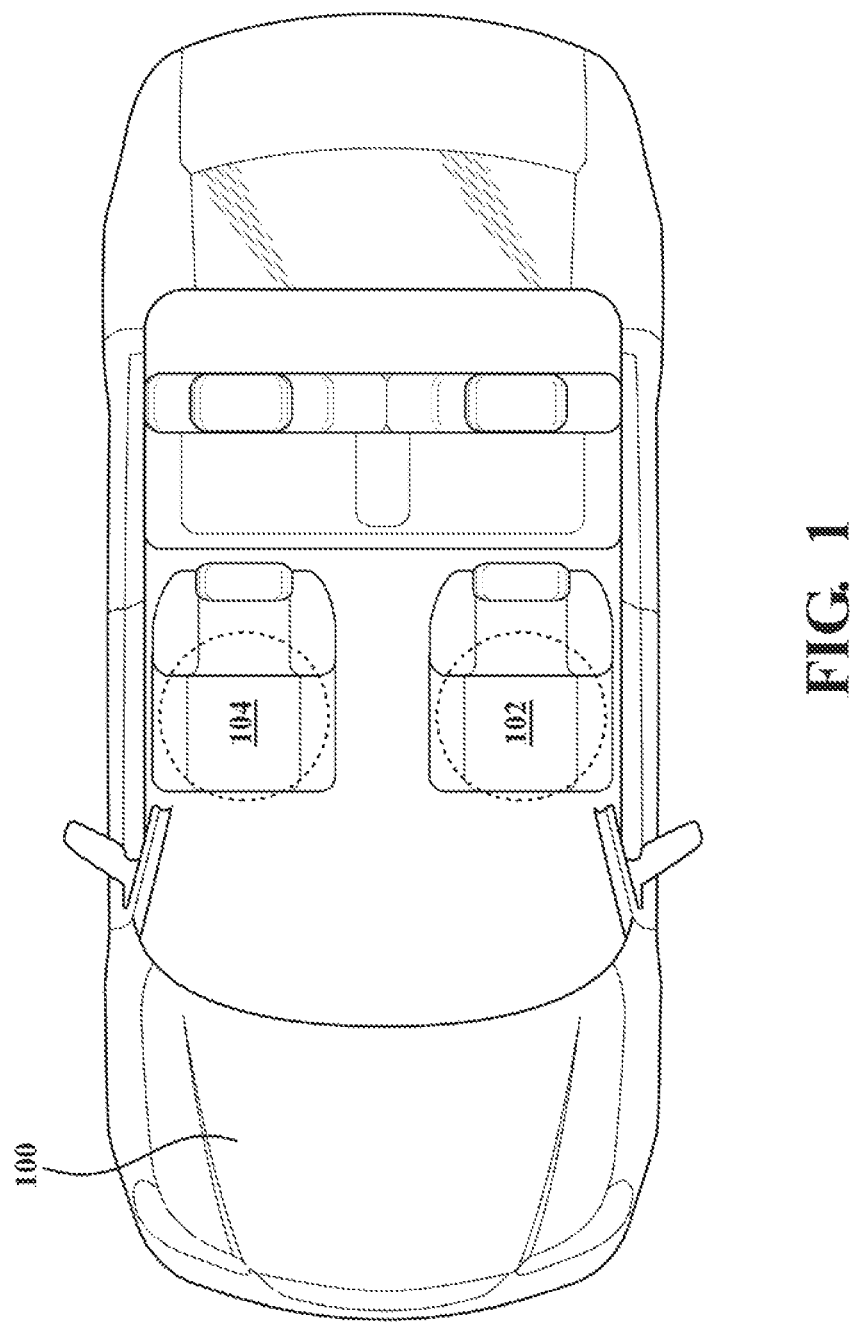
FIG. 1 is a top view of an example listening environment, a vehicle interior, with individual sound zones.

FIG. 1 shows a listening environment as a vehicle interior 100 having sound zones 102 and 104 that may be subjected to a signal processing arrangement of one or more embodiments of the present disclosure. At least two sound zones 102 and 104 are shown for example purposes only and there may be more than two sound zones in any one listening environment. A listening environment is an area in which sound is distributed. For individual sound zones within a listening environment, a different sound is reproduced for each zone. In order to realize individual sound zones, it is necessary to adjust the response of multiple sound sources to approximate a desired sound field in the reproduction zone without interfering with other individual sound zones. An example of how individual sound zones are realized is detailed in U.S. Pat. No. 9,338,554, assigned to the assignee of the present disclosure, and incorporated herein by reference.

Figure 2:
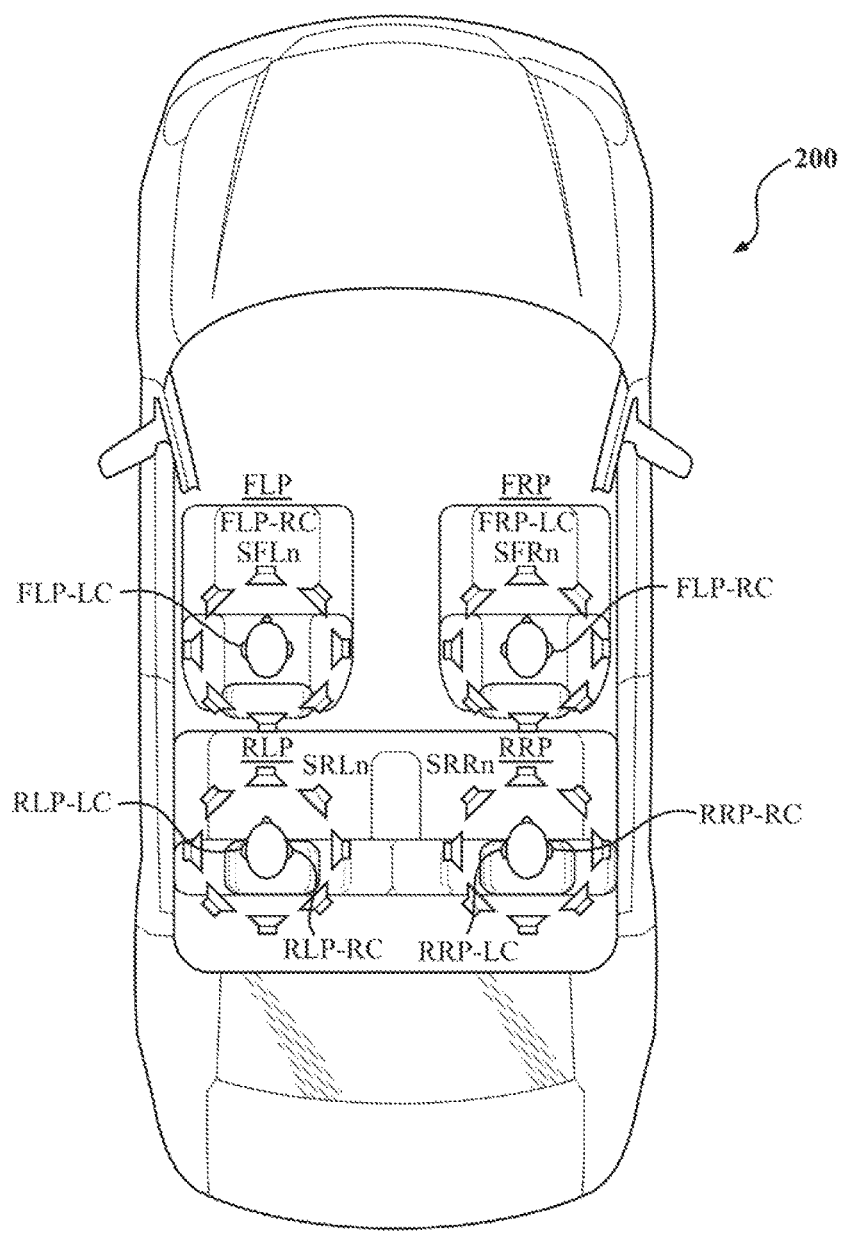
FIG. 2 is a top view of a vehicle interior with loudspeakers arranged in each individual sound zone around a listener's head position.

The example system shown in FIG. 1 relies on a plurality of loudspeakers positioned throughout the vehicle. The loudspeakers are typically positioned in a headrest and in the vehicle headliner at one or more listening positions. Incoming audio signals are processed and the loudspeaker output is controlled to personalize the sound for each zone. Referring to FIG. 2, a top view of a vehicle interior 200 is shown with an exemplary four listening positions: front left listening position FLP, front right listening position FRP, rear left listening position RLP and rear right listening position RRP. A stereo signal with left and right channels is reproduced so that a stereo audio signal is received at each listening position: front left position left and right channels FLP-LC and FLP-RC, front right position left and right channels FRP-LC and FRP-RC, rear left position left and right channels RLP-LC and RLP-RC, and rear right position left and right channels RRP-LC and RRP-RC. Each channel may include a loudspeaker or a group of loudspeakers of the same or different type, such as woofers, midrange loudspeakers and tweeters. Loudspeakers are integrated into the headliner, left and right above the listening positions FLP, FRP, RLP and RRP. It is advantageous for a distance between the listener's ears and the corresponding loudspeakers be kept as short as possible to increase the natural isolation of speakers between zones. Additionally, a vehicle may be equipped with mid-range and high frequency speakers (not shown in FIG. 2) typically located in the front, rear and sides of the vehicle, such as in the instrument panel, vehicle floor, vehicle door panels, and/or trunk space.

The Individual Sound Zone (ISZ) algorithm has been applied as a solution for mono audio. One or more embodiments of the present disclosure utilizes such ISZ algorithms for bass frequency processing of the audio by applying a low pass filter and maintains a remainder of the frequency band (mid to high frequency), including volume control, in stereo and/or surround sound. Components of the audio signal are separated using a high pass filter to keep the stereo/surround information to be distributed to speakers. According to one or more embodiments of the present disclosure, speakers in the headrests also keep their stereo configuration but the low frequency components are passed to mono. In this regard, the audio content may be played to each of the zones at different volumes, depending on a volume control set by a user at each individual sound zone. Ideally, when a user in one zone adjusts their volume, the users in other zones will not detect a difference in the volume of their own individual sound zone.

Figure 3:
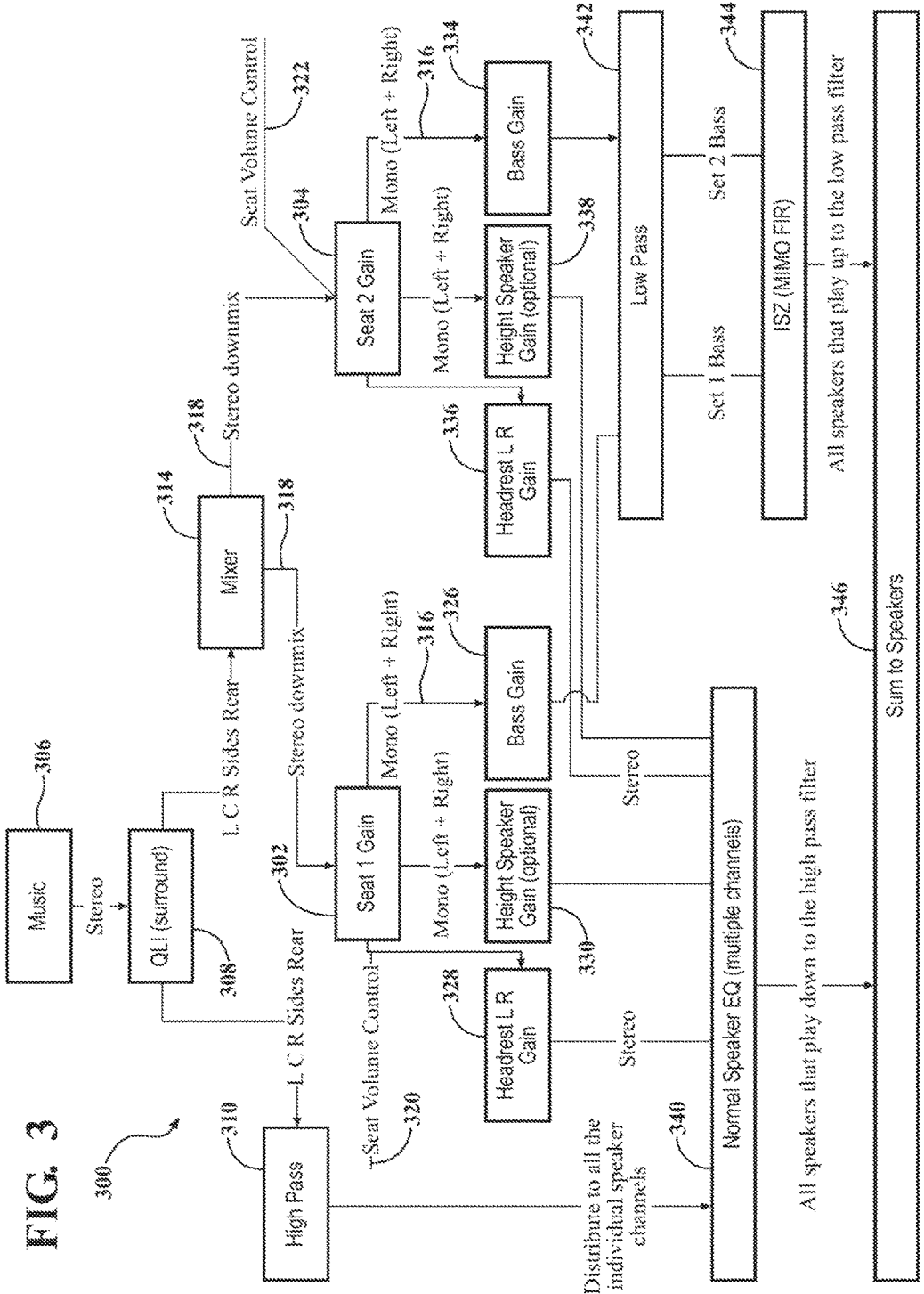
FIG. 3 is a block diagram illustrating a processing arrangement for independent volume adjustment in individual sound zones.

FIG. 3 is a block diagram illustrating a signal processing arrangement 300 configured for independently adjusting volume in two or more individual sound zones. The signal processing arrangement 300 includes various functional blocks that may be implemented by hardware and/or software components within a head unit or control unit of an audio system. For simplicity, the example shown is for two individual sound zones 302, 304. However, it should be noted that one skilled in the art is capable of applying the signal processing arrangement in a way that applies to more than two individual sound zones. An incoming audio signal 306, such as music from a stereo, is passed through a stereo upmixer 308, such as a multi-channel surround-sound process or algorithm to convert the input into a multi-channel output. The audio is processed to separate the audio content into a low-frequency portion and a mid-range and/or high-frequency portion. The separated frequency portions are routed to various speakers within the audio system to provide a tunable audio field within the listening environment.

For an audio signal that is not subjected to an independent volume adjustment for an individual sound zone, related to mid-range and high frequency speakers in the vehicle, such as in the vehicle instrument panel and door panels, and is in accordance with a master volume setting, a high pass filter 310 is applied and the output is provided to an equalizer 340.

An audio signal that is to be subjected to individual sound zone volume treatment using speakers in the headrest and one or more height speakers in the headliner that are associated with a listening position in individual sound zones 302, 304 is processed using a different algorithm than the audio signal that is not subjected to an independent volume adjustment discussed above. For example, for an audio signal that is subjected to an individual sound zone volume adjustment, a mixer 314 separates and directs the high and low frequency components of the incoming audio signal into a single direct bass component and a higher frequency portion (i.e., mid-range and/or high-frequency portions) 318 for each sound zone 302, 304. The low-frequency direct bass portion 316 of the signal 318 is directed through a low pass filter 342 and ISZ (MIMO FIR) 344. The ISZ (MIMO FIR) block 344 has multiple inputs each representing an individual sound zone. The outputs are directly attached to the speakers. Each sound zone accepts the mono audio signal and it outputs to all the speakers but targets hearing the mono audio signal only in that individual sound zone.

A specific zone volume preference that is distinct from the master volume setting may be selected by a listener at each sound zone 302, 304. In the example shown in FIG. 3 a user input 320 for a first zone 302 and a user input 322 for a second zone 304 are received at each respective zone to adjust a gain at each zone. The user input may be a control device such as a knob, slider, either mechanical or visual, to indicate a volume level desired by the user. The user input may be a physical attribute or it may be an input, generated at a portable device and communicated wirelessly to the zone 302, 304.

In any event, the user input 320 sets a volume preference for the individual sound zone 302 that is different than the master volume setting. The mid to high frequency components are separated from the low frequency base components. A separate bass gain 326 for the low frequency component 316 is applied. A headrest gain (in stereo) 328 is adjusted for the headrest loudspeakers. A gain 330 for the height speakers, located in the headliner, which may be mono or stereo, is also adjusted.

A similar process is applied to a second zone 304. The user input 322 sets a volume preference for the individual sound zone 304 that is different than the volume setting for individual sound zone 302 and different than the master volume setting. A separate bass gain 334 is applied to the low frequency component 316. A gain 336 for the headrest loudspeakers is adjusted and a gain 338 for the speakers located in the headliner, which may be mono or stereo, is also adjusted.

All of the low frequency components are then sent through low pass filter 342 and are subject to the ISZ (MIMO FIR) algorithm 344. While all of the stereo components adjusted by the headrest and height gain for each individual sound zone are provided to the equalizer 340.

Ultimately, the processed audio signal components are added together at summer 346 to recreate output derived from the normal, mid-range and high frequency speakers in the vehicle as shown on the left side of FIG. 3, the headrest and height gain output for the independent volume adjustments at each individual sound zone, and the bass ISZ (MIMO FIR) algorithm output.

The embodiments of the present disclosure use headrest and optional height speakers for each individual sound zone's independent volume for mid and high frequencies. Further, ISZ and low pass filters are used for the bass frequencies. The control signals change the gain for headrest speakers and the ISZ bass for each individual sound zone.

In the foregoing specification, the present disclosure has been described with reference to specific exemplary embodiments. Various modifications and changes may be made, however, without departing from the scope of the present disclosure as set forth in the claims. The specification and figures are illustrative, rather than restrictive, and modifications are intended to be included within the scope of the present disclosure. Accordingly, the scope of the present disclosure should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present disclosure, in addition to those not specifically recited, may be varied or otherwise particularly adapted to specific environments, manufacturing specifications, design parameters or other operating requirements without departing from the general principles of the same.

The invention claimed is:

1. A system for independent volume adjustment of an audio signal for a sound zone in a plurality of sound zones, the system comprising:
   a plurality of loudspeakers associated with each sound zone in the plurality of sound zones;
   a tuning system having an equalizer applied to each loudspeaker in the plurality of loudspeakers for each sound zone;
   a master volume control setting for the tuning system;
   a gain modification setting for each sound zone that is set independently for each sound zone and differs from the master volume control setting, the gain modification setting having a headrest gain setting for a stereo component of the audio signal and a bass gain setting for a mono component of the audio signal;
   a high pass filter applied to the audio signal to separate a stereo component for distribution to the plurality of loudspeakers in each sound zone in the plurality of sound zones and applying the headrest gain setting to the stereo component;
   a low pass filter applied to the audio signal to separate a low frequency mono component for distribution to the plurality of loudspeakers in each sound zone and applying the bass gain setting to the low frequency mono component, the low frequency mono component having an individual sound zone algorithm applied thereto for distribution to all of the loudspeakers in the plurality of loudspeakers so that each individual zone uses the bass gain settin; and
   routing the modified stereo component of the audio signal and the modified mono component of the audio signal to predetermined loudspeakers thereby defining a tunable field for each sound zone in the plurality of sound zones.

2. The system as claimed in claim 1 wherein the gain modification for each sound zone setting further comprises a height speaker gain setting applied to the low frequency mono component for distribution to the plurality of loudspeakers.

3. A non-transitory computer readable medium comprising a program for an audio signal to be played at a plurality of speakers in a vehicle audio system, the program is executed by at least one processor to perform the steps of:
   applying a master volume control setting to the audio signal;
   separating the audio signal into low, mid-range, and high frequency components;
   passing the low frequency component to a mono configuration;
   passing the mid-range and high-frequency components to a stereo configuration;
   applying an individual volume control setting to each individual sound zone in a plurality of individual sound zones for any volume control setting that differs from the master volume control setting, the individual volume control setting is applied to the low frequency component of the audio signal;
   applying the headrest gain to the mid-range and high frequency components of the audio signal;
   applying the bass gain to the low frequency components of the audio signal; and
   routing the frequency components to predetermined sneakers of the plurality of speakers.

4. The program non-transitory computer readable medium as claimed in claim 3 wherein the individual volume control setting further comprises a height speaker gain and further comprising the step of applying the height speaker gain to the mid-range and high frequency components of the audio signal.

5. A method for controlling an individual volume control setting for playing an audio signal in a vehicle audio system having a plurality of loudspeakers, the vehicle audio system has an audio signal processing system and an individual sound zone processing system for a plurality of sound zones in the vehicle, the method comprising the steps of:
   applying a master volume control setting to the audio signal;
   applying an individual volume control setting independently defined at each sound zone in the plurality of sound zones, the individual volume control setting has a headrest gain and a bass gain, the individual volume control setting differs from the master volume control setting;
   applying the head rest gain to a stereo component of the audio signal; and
   applying the bass gain to a mono component of the audio signal for playback at less than all of the loudspeakers in the vehicle audio system.

6. The method as claimed in claim 5 wherein the individual volume control setting further comprises a height speaker gain and the step of applying a user defined individual volume control setting further comprises the step of applying the height speaker gain to a mono component of the audio signal.

7. The method as claimed in claim 5 wherein the bass gain setting is applied to fewer than all loudspeakers in the plurality of loudspeakers.

\* \* \* \* \*